United States Patent
Allen

(10) Patent No.: US 9,283,603 B2
(45) Date of Patent: Mar. 15, 2016

(54) PIVOT LINK FOR BENDING BRAKE

(71) Applicant: Tapco International Corporation, Wixom, MI (US)

(72) Inventor: Clyde Allen, Columbiaville, MI (US)

(73) Assignee: Tapco International Corporation, Wixom, MI (US)

( * ) Notice: Subject to any disclaimer, the term of this patent is extended or adjusted under 35 U.S.C. 154(b) by 299 days.

(21) Appl. No.: 13/848,103

(22) Filed: Mar. 21, 2013

(65) Prior Publication Data

US 2014/0283575 A1    Sep. 25, 2014

(51) Int. Cl.
*B21D 5/04* (2006.01)
*F16B 7/06* (2006.01)
*F16B 2/12* (2006.01)
*F16B 35/00* (2006.01)

(52) U.S. Cl.
CPC . *B21D 5/042* (2013.01); *F16B 7/06* (2013.01); *F16B 2/12* (2013.01); *F16B 35/005* (2013.01); *Y10T 403/56* (2015.01)

(58) Field of Classification Search
CPC .......... B21D 5/04; B21D 5/042; B21D 11/00; B21D 11/20; Y10T 74/20588
See application file for complete search history.

(56) References Cited

U.S. PATENT DOCUMENTS

| | | | |
|---|---|---|---|
| 4,445,356 A | | 5/1984 | Chubb et al. |
| 4,766,757 A | * | 8/1988 | Break et al. ............... 72/319 |
| 5,353,620 A | * | 10/1994 | Olsen et al. ............... 72/319 |
| 5,761,939 A | | 6/1998 | Spencer et al. |
| 7,228,721 B2 | | 6/2007 | Clark |
| 7,484,396 B2 | | 2/2009 | Clark |
| 2013/0295238 A1 | * | 11/2013 | Cooksey ................ 426/115 |
| 2013/0333308 A1 | * | 12/2013 | Kumar ..................... 52/155 |

* cited by examiner

*Primary Examiner* — Debra Sullivan
(74) *Attorney, Agent, or Firm* — Quinn Law Group, PLLC

(57) ABSTRACT

A pivot link for interconnecting a locking bar and a pivoting arm of a sheet bending brake includes an arm portion and a locking bar portion. The arm portion defines a first threaded bore, and the locking bar portion defines a second threaded bore. A threaded stud extends between and interconnects the arm portion and the locking bar portion, and is disposed in threaded engagement with both the arm portion and the locking bar portion. The threaded stud includes a first thread portion in threaded engagement with the first threaded bore, and a second thread portion in threaded engagement with the second threaded bore. The first threaded bore and the first thread portion include one of a left hand thread or a right hand thread, and the second threaded bore and the second thread portion include the other of the left hand thread or the right hand thread.

25 Claims, 3 Drawing Sheets

PIVOT LINK FOR BENDING BRAKE

TECHNICAL FIELD

The invention generally relates to a sheet bending brake, and more particularly to a pivot link that reacts between a frame member and a pivoting arm to move the pivoting arm between an open position and a clamping position.

BACKGROUND

Sheet bending brakes are used for bending and cutting sheets of metal or vinyl work pieces, such as those used for siding on buildings. The sheet bending brake operates by clamping the work piece between opposing clamping surfaces, and using a hinged bending arm to bend the work piece.

Actuation of the clamping system is controlled by rotation of a locking bar. The locking bar is rotatable relative to a frame member about a longitudinal axis of the locking bar. A pivoting arm is rotatably attached to the frame member, and defines an upper clamping surface for engaging the work piece. The pivoting arm is connected to the locking bar via a pivot link. The pivot link is rotatable relative to both the locking bar and the pivot arm. Rotation of the locking bar moves the pivot link, which in turn moves the pivoting arm between an open position and a clamping position.

The pivot link must be adjustable to provide the appropriate clamping force and accommodate different material thicknesses of the work piece. Additionally, the pivot link must be durable so as not to yield or bend under the forces generated during the clamping process.

SUMMARY

A sheet bending brake is provided. The sheet bending brake includes a frame member having a lower leg and an upper leg. The lower leg extends outward to present a lower clamping surface. The upper leg extends outward in spaced relationship relative to the lower leg. A pivoting arm is pivotably attached to and extends outward from the frame member to present an upper clamping surface. The upper clamping surface engages the lower clamping surface. A locking bar is rotatably connected to the upper arm of the fame member for rotation about a longitudinal axis of the locking bar. A pivot link interconnects the locking bar and the pivoting arm. The pivot link is operable to move the pivoting arm between an open position and a clamping position in response to rotation of the locking bar about the longitudinal axis of the locking bar. The pivot link includes an arm portion and a locking bar portion. The arm portion is rotatably attached to the pivoting arm for rotation about a first link axis. The locking bar portion is rotatably attached to the locking bar for rotation about a second link axis. A threaded stud extends between and interconnects the arm portion and the locking bar portion. The threaded stud is disposed in threaded engagement with both the arm portion and the locking bar portion.

A pivot link for interconnecting a locking bar and a pivoting arm of a sheet bending brake is also provided. The pivot link includes an arm portion and a locking bar portion. The arm portion defines a first threaded bore, and the locking bar portion defines a second threaded bore. A threaded stud extends between and interconnects the arm portion and the locking bar portion. The threaded stud is disposed in threaded engagement with both the arm portion and the locking bar portion. The threaded stud includes a first thread portion in threaded engagement with the first threaded bore, and a second thread portion in threaded engagement with the second threaded bore. The first threaded bore and the first thread portion include one of a left hand thread form or a right hand thread form, and the second threaded bore and the second thread portion include the other of the left hand thread form or the right hand thread form.

Accordingly, because the threaded stud is in threaded engagement with both the locking bar portion and the arm portion of the pivot link, and because the threading between the threaded stud and the first threaded bore is opposite the threading between the threaded stud and the second threaded bore, rotation of the threaded stud moves both the arm portion and the locking bar portion of the pivot link relative to the threaded stud, thereby increasing the speed of adjustment. Furthermore, the opposite thread forms prevent the stud from vibrating out of position, thereby eliminating the need for any form of retention mechanism. The thread forms may include a fine thread form as defined by the Unified Thread Standard to increase engagement therebetween and improve adjustability.

The above features and advantages and other features and advantages of the present invention are readily apparent from the following detailed description of the best modes for carrying out the invention when taken in connection with the accompanying drawings.

DETAILED DESCRIPTION

Figure 1:
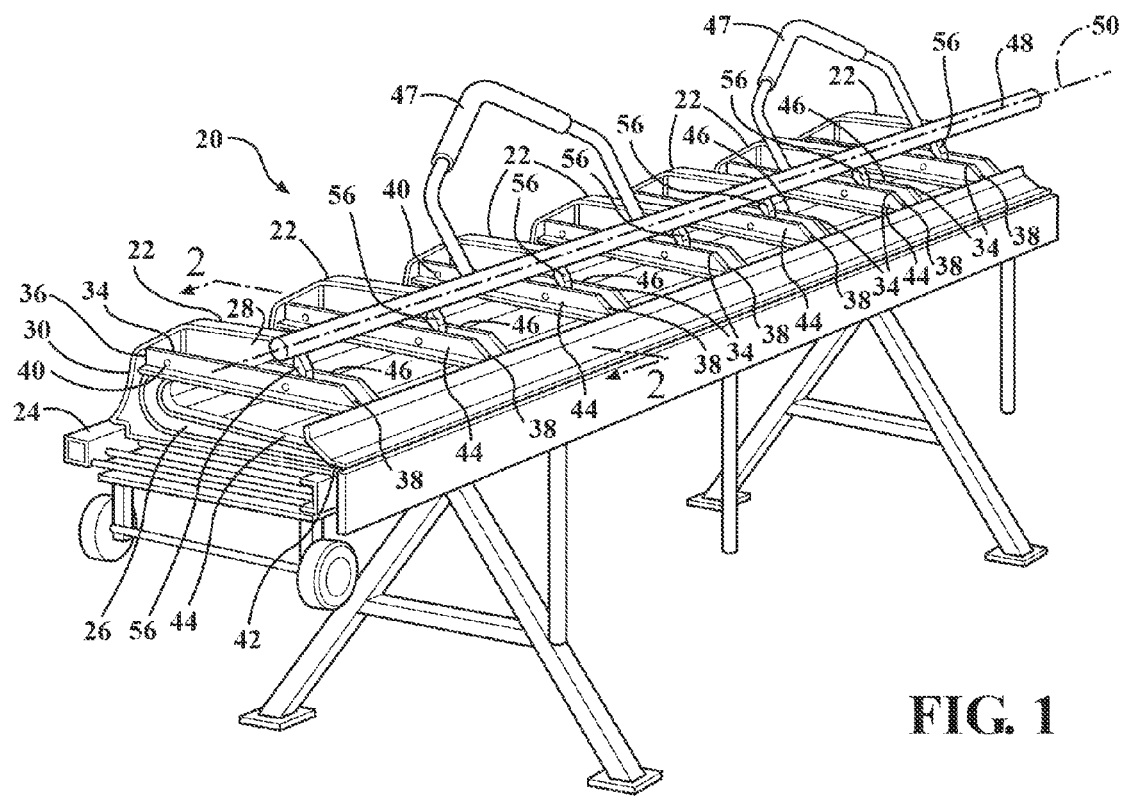
FIG. 1 is a schematic perspective view of a sheet bending brake.
Figure 3:
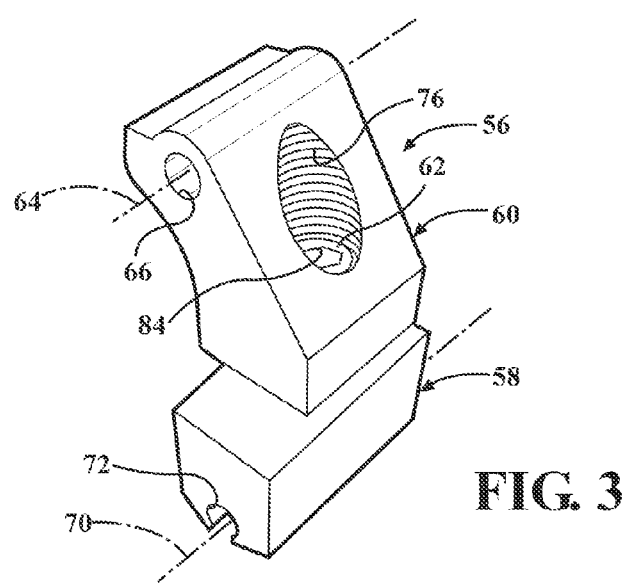
FIG. 3 is a schematic perspective view of a pivot link of the sheet bending brake.

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be realized by any number of hardware, software, and/or firmware components configured to perform the specified functions.

Referring to the Figures, wherein like numerals indicate like parts throughout the several views, a sheet bending brake is generally shown at 20. The sheet bending brake 20 is operable to secure a work piece, such as but not limited to panel siding for a building, for example, vinyl siding.

The sheet bending brake 20 includes at least one, and preferably a plurality of frame members 22, supported by a table 24. The frame members 22 are longitudinally spaced along the table 24 to support different length work pieces. Each of the frame members 22 is identically configured. As such, while the detailed description refers to only a single frame member 22, it should be appreciated that the detailed description of the frame member 22 is applicable to all of the frame members 22. The frame member 22 includes a lower leg 26 and an upper leg 28 extending outward from a central base region 30 to form a generally C-shaped configuration. The lower leg 26 extends outward to present a lower clamping surface 32 at a distal end of the lower leg 26. The upper leg 28 extends outward in spaced relationship relative to the lower leg 26.

A pivoting arm 34 is pivotably attached to and extends outward from each of the frame members 22. The pivoting arm 34 includes a secured end 36 attached to the frame member 22 adjacent the central base region 30 of the frame member 22, and extends outward to a free end 38. The pivoting arm 34 may be attached to the frame member 22 in any suitable manner that allows the pivoting arm 34 to rotate relative to the frame member 22. For example, a bolt 40 may secure the pivoting arm 34 to the frame member 22 and define an axis about which the pivoting arm 34 may rotate. The free end 38 of the pivoting arm 34 presents an upper clamping surface 42 disposed adjacent a distal end of the upper leg 28, and opposite the lower clamping surface 32 of the lower leg 26. The upper clamping surface 42 engages the lower clamping surface 32 to secure the work piece therebetween. As shown in the Figures, the pivoting arm 34 includes a first arm 44 and a second arm 46 disposed on opposite sides of the frame member 22.

A handle 47 is attached to a locking bar 48, which is rotatably connected to the upper arm of the fame member. The locking bar 48 is rotatable about a longitudinal axis 50 of the locking bar 48. The locking bar 48 may be rotatably connected to the distal end of the upper arm in any suitable manner. For example, an elongated pin 52 may extend through elongated coaxial apertures 54 defined by both the upper arm and the locking bar 48 to form a hinge and provide rotation of the locking bar 48 relative to the frame member 22.

Figure 2:
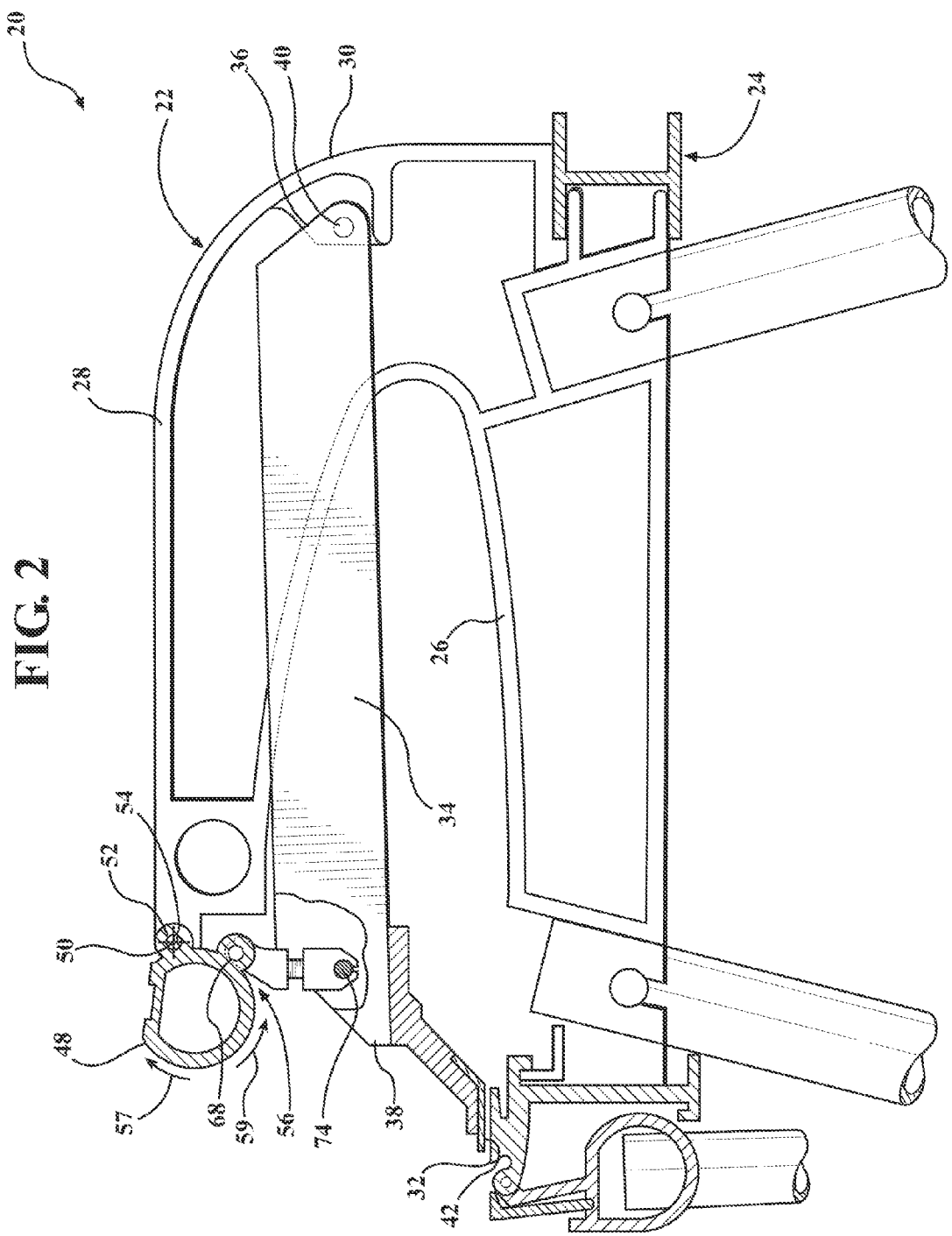
FIG. 2 is a schematic cross sectional view of the sheet bending brake taken along cut line 2-2 shown in FIG. 1.
Figure 4:
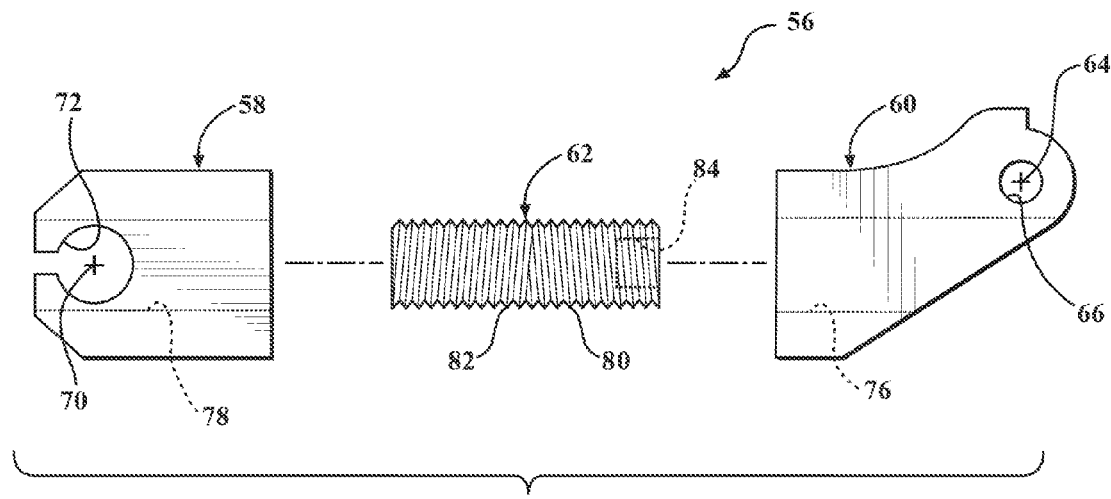
FIG. 4 is a schematic exploded side view of the pivot link.
Figure 5:
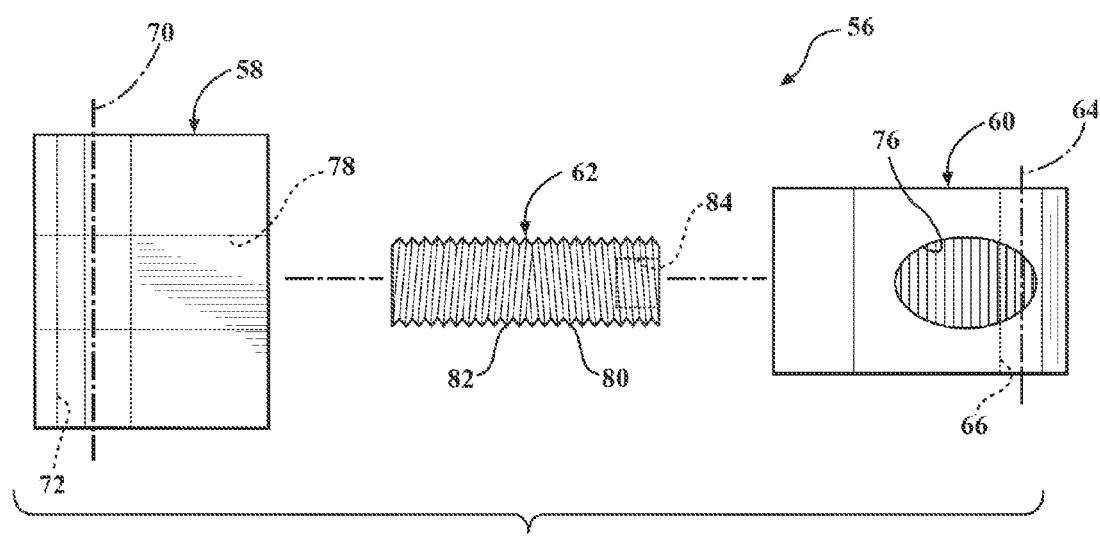
FIG. 5 is a schematic exploded front view of the pivot link.

A pivot link 56 interconnects the locking bar 48 and the pivoting arm 34. The pivot link 56 is positioned between the first arm 44 and the second arm 46 of the pivoting arm 34. The pivot link 56 is operable and reacts between the upper leg 28 of the frame member 22 and the pivoting arm 34 to move the pivoting arm 34 between an open position and a clamping position, in response to rotation of the locking bar 48 about the longitudinal axis 50 of the locking bar 48. The pivoting arm 34 is shown in the closed position in FIG. 2. When the locking bar 48 is rotated in a first direction, e.g., a clockwise, generally indicated by direction arrow 57 shown in FIG. 2, the locking bar 48 moves the pivot link 56 and the pivoting arm 34 into the open position, i.e., raises the pivoting arm 34 to move the upper clamping surface 42 away from the lower clamping surface 32, to allow the work piece to be inserted between the upper clamping surface 42 and the lower clamping surface 32. When the locking bar 48 is rotated in a second direction, opposite the first direction, e.g., a counter clockwise direction, generally indicated by direction arrow 59 shown FIG. 2, the locking bar 48 moves the pivot link 56 and the pivoting arm 34 into the clamping position, i.e., lowers the pivoting arm 34 to bring the upper clamping surface 42 into clamping engagement with the lower clamping surface 32.

The pivot link 56 includes an arm portion 58, a handle portion 60, and a threaded stud 62. Preferably, the arm portion 58, the handle portion 60 and/or the threaded stud 62 are constructed from a metal, such as but not limited to aluminum or steel. However, the arm portion 58, the handle portion 60 and/or the threaded stud 62 may be constructed of some other material. The threaded stud 62 extends between and interconnects the arm portion 58 and the handle portion 60. Preferably, the threaded stud 62 includes a major diameter, as defined by the Unified Thread Standard, which is equal to one half inch (½"). However, it should be appreciated that the major diameter of the threaded stud 62 may vary from the preferred embodiment.

The handle portion 60 may alternatively be referred to herein as the locking bar portion 60. The handle portion 60 of the pivot link 56 is rotatably attached to the locking bar 48. The handle portion 60 is rotatable about a first link axis 64. The handle portion 60 may be attached to the locking bar 48 in any suitable manner. For example, the handle portion 60 may define a first cross bore 66 disposed concentric about the first link axis 64, and include a shaft 68 that is supported by the locking bar 48 and extends through the first cross bore 66 to rotatably attach the handle portion 60 of the pivot link 56 to the locking bar 48.

The arm portion 58 of the pivot link 56 is rotatably attached to the pivoting arm 34. The arm portion 58 is rotatable about a second link axis 70. The first link axis 64 and the second link axis 70 are parallel with each other, and are parallel with the longitudinal axis 50 of the locking bar 48. The arm portion 58 may be attached to the pivoting arm 34 in any suitable manner. For example, the arm portion 58 may define a second cross bore 72 disposed concentric about the second link axis 70, and include a bolt 74 that is supported by the pivoting arm 34 and extends through the second cross bore 72 to rotatably attach the arm portion 58 of the pivot link 56 to the pivoting arm 34.

The threaded stud 62 is disposed in threaded engagement with both the arm portion 58 and the handle portion 60. The handle portion 60 defines a first threaded bore 76 in threaded engagement with the threaded stud 62. The arm portion 58 defines a second threaded bore 78 in threaded engagement with the threaded stud 62. The first threaded bore 76 and the second threaded bore 78 are perpendicular to the first link axis 64 and the second link axis 70. The threaded stud 62 includes a first thread portion 80 in threaded engagement with the first threaded bore 76, and a second thread portion 82 in threaded engagement with the second threaded bore 78. The first threaded bore 76 and the first thread portion 80 include one of a left hand thread form or a right hand thread form, and the second threaded bore 78 and the second thread portion 82 include the other of the left hand thread form or the right hand thread form. Preferably, the first threaded bore 76 and the first thread portion 80 include the right hand thread form, and the second threaded bore 78 and the second thread portion 82 include the left hand thread form.

The left hand thread form and the right hand thread may each include an identical thread configuration so that rotation of the threaded stud 62 moves both the handle portion 60 and the arm portion 58 equally relative to the threaded stud 62. Preferably, each of the left hand thread form and the right hand thread form include a fine thread form as defined by the Unified Thread Standard. The fine thread form allows more precise adjustment between the threaded stud 62 and the arm portion 58 and the handle portion 60 respectively, and also improves the mechanical engagement therebetween.

Threaded stud 62 includes a tool engagement mechanism 84 disposed at an axial end of the threaded stud 62. The tool engagement mechanism 84 is accessible through the first threaded bore 76 of the handle portion 60. The tool engagement mechanism 84 may be engaged by a tool (not shown) to rotate the threaded stud 62 within the first threaded bore 76 and the second threaded bore 78 simultaneously. The tool engagement mechanism 84 may include, for example, a hexagonal recess for receiving an allen key, or some other similar mechanism to facilitate rotation of the threaded stud 62.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A sheet bending brake comprising:
   a frame member having a lower leg extending outward to present a lower clamping surface, and an upper leg extending outward in spaced relationship relative to the lower leg;
   a pivoting arm pivotably attached to and extending outward from the frame member to present an upper clamping surface for engaging the lower clamping surface;
   a locking bar rotatably connected to the upper arm of the frame member for rotation about a longitudinal axis of the locking bar; and
   a pivot link interconnecting the locking bar and the pivoting arm, and operable to move the pivoting arm between an open position and a clamping position in response to rotation of the locking bar about the longitudinal axis of the locking bar, the pivot link including:
      an arm portion rotatably attached to the pivoting arm for rotation about a first link axis;
      a locking bar portion rotatably attached to the locking bar for rotation about a second link axis; and
      a threaded stud extending between and interconnecting the arm portion and the locking bar portion, and disposed in threaded engagement with both the arm portion and the locking bar portion.

2. A sheet bending brake as set forth in claim 1 wherein the locking bar portion defines a first threaded bore in threaded engagement with the threaded stud, and the arm portion defines a second threaded bore in threaded engagement with the threaded stud.

3. A sheet bending brake as set forth in claim 2 wherein the threaded stud includes a first thread portion in threaded engagement with the first threaded bore, and a second thread portion in threaded engagement with the second threaded bore.

4. A sheet bending brake as set forth in claim 3 wherein the first threaded bore and the first thread portion include one of a left hand thread form or a right hand thread form, and the second threaded bore and the second thread portion include the other of the left hand thread form or the right hand thread form.

5. A sheet bending brake as set forth in claim 4 wherein the first threaded bore and the first thread portion include the right hand thread form, and the second threaded bore and the second thread portion include the left hand thread form.

6. A sheet bending brake as set forth in claim 4 wherein the left hand thread form and the right hand thread form include a fine thread form as defined by the Unified Thread Standard.

7. A sheet bending brake as set forth in claim 2 wherein the first link axis and the second link axis are parallel with each other and parallel with the longitudinal axis of the locking bar.

8. A sheet bending brake as set forth in claim 7 wherein the first threaded bore and the second threaded bore are perpendicular to the first link axis and the second link axis.

9. A sheet bending brake as set forth in claim 1 wherein the threaded stud includes a major diameter as defined by the Unified Thread Standard that is equal to one half inch (½").

10. A sheet bending brake as set forth in claim 1 wherein the locking bar portion defines a first cross bore disposed concentric about the first link axis.

11. A sheet bending brake as set forth in claim 10 further comprising a shaft supported by the locking bar and extending through the first cross bore to rotatably attach the locking bar portion of the pivot link to the locking bar.

12. A sheet bending brake as set forth in claim 11 further comprising a bolt supported by the pivoting arm and extending through the second cross bore to rotatably attach the arm portion of the pivot link to the pivoting arm.

13. A sheet bending brake as set forth in claim 1 wherein the arm portion defines a second cross bore disposed concentric about the second link axis.

14. A sheet bending brake comprising:
   a frame member having a lower leg and an upper leg extending outward in spaced relationship relative to the lower leg;
   a pivoting arm pivotably attached to the frame member; and
   a pivot link reacting between the upper leg of the frame member and the pivoting arm, and operable to move the pivoting arm between an open position and a clamping position, the pivot link including:
      an arm portion rotatably attached to the pivoting arm for rotation about a first link axis;
      a locking bar portion rotatably coupled to the upper leg of the frame member for rotation about a second link axis; and
      a threaded stud extending between and interconnecting the arm portion and the locking bar portion, and disposed in threaded engagement with both the arm portion and the locking bar portion.

15. A sheet bending brake as set forth in claim 14 wherein the locking bar portion defines a first threaded bore in threaded engagement with the threaded stud, and the arm portion defines a second threaded bore in threaded engagement with the threaded stud.

16. A sheet bending brake as set forth in claim 15 wherein the threaded stud includes a first thread portion in threaded engagement with the first threaded bore, and a second thread portion in threaded engagement with the second threaded bore.

17. A sheet bending brake as set forth in claim 16 wherein the first threaded bore and the first thread portion include one of a left hand thread form or a right hand thread form, and the second threaded bore and the second thread portion include the other of the left hand thread form or the right hand thread form.

18. A sheet bending brake as set forth in claim 17 wherein the first threaded bore and the first thread portion include the right hand thread form, and the second threaded bore and the second thread portion include the left hand thread form.

19. A sheet bending brake as set forth in claim 17 wherein the left hand thread form and the right hand thread form include a fine thread form as defined by the Unified Thread Standard.

20. A sheet bending brake as set forth in claim 14 wherein the threaded stud includes a major diameter as defined by the Unified Thread Standard that is equal to one half inch (½").

21. A pivot link for interconnecting a locking bar and a pivoting arm of a sheet bending brake, the pivot link comprising:
   a locking bar portion defining a first threaded bore;
   an arm portion defining a second threaded bore; and
   a threaded stud extending between and interconnecting the arm portion and the locking bar portion, and disposed in threaded engagement with both the arm portion and the locking bar portion;
   wherein the threaded stud includes a first thread portion in threaded engagement with the first threaded bore, and a second thread portion in threaded engagement with the second threaded bore; and wherein the first threaded bore and the first thread portion include one of a left hand thread form or a right hand thread form, and the second threaded bore and the second thread portion include the other of the left hand thread form or the right hand thread form.

22. A pivot link as set forth in claim 21 wherein the first threaded bore and the first thread portion include the right hand thread form, and the second threaded bore and the second thread portion include the left hand thread form.

23. A pivot link as set forth in claim 21 wherein the left hand thread form and the right hand thread form include a fine thread form as defined by the Unified Thread Standard.

24. A pivot link as set forth in claim 21 wherein the threaded stud includes a major diameter as defined by the Unified Thread Standard that is equal to one half inch (½").

25. A pivot link as set forth in claim 21 wherein the locking bar portion defines a first cross bore disposed concentric about a first link axis, and the arm portion defines a second cross bore disposed concentric about a second link axis, and wherein the first link axis and the second link axis are parallel with each other.

\* \* \* \* \*